United States Patent [19]

Winkler

[11] Patent Number: 4,894,942

[45] Date of Patent: Jan. 23, 1990

[54] UNDERWATER SPECIMEN COLLECTING DEVICE

[76] Inventor: Charles Winkler, 722 Ellery Dr., San Pedro, Calif. 90732

[21] Appl. No.: 223,616

[22] Filed: Jul. 25, 1988

[51] Int. Cl.$^4$ ............................................. A01K 73/00
[52] U.S. Cl. ......................................................... 43/4
[58] Field of Search ........................... 43/4, 139, 132.1

[56] References Cited

U.S. PATENT DOCUMENTS

| | | | |
|---|---|---|---|
| 3,104,928 | 9/1963 | Hester | 43/4 |
| 3,184,878 | 5/1965 | Senne | 43/4 |
| 3,231,997 | 2/1966 | Shugarman | 43/139 |
| 3,486,264 | 12/1969 | Mounier et al. | 43/4 |
| 3,549,015 | 12/1970 | Willinger | 43/4 |

OTHER PUBLICATIONS

"A Pneumatically Operated Slurp Gun", by J. Ross Wilcox et al., Limnology and Oceanography, vol. 19, No. 2, Mar. 1974, pp. 354–355.

Primary Examiner—Nicholas P. Godici
Assistant Examiner—Michael William Starkweather
Attorney, Agent, or Firm—Charles H. Thomas

[57] ABSTRACT

A pneumatically operated device for collecting biological specimens under water in a receiving chamber and employing a pneumatically operated plunger for creating suction at an intake to the receiving chamber is provided with a nozzle having a movable end remote from the intake. A pneumatic nozzle activator is operated in tandem with the plunger to extend the movable end of the nozzle away from the intake and toward a live biological specimen to be trapped. Concurrent retraction of the plunger and extension of the movable nozzle end toward the specimen, enhances the likelihood of a successful capture. A specimen collecting container may be coupled to the receiving chamber, and flapper valves within the nozzle, at the receiving chamber intake, and at a specimen collecting port leading to the collecting container facilitate the direction of the specimen into the collection container while reducing the likelihood that the specimen will escape.

20 Claims, 3 Drawing Sheets

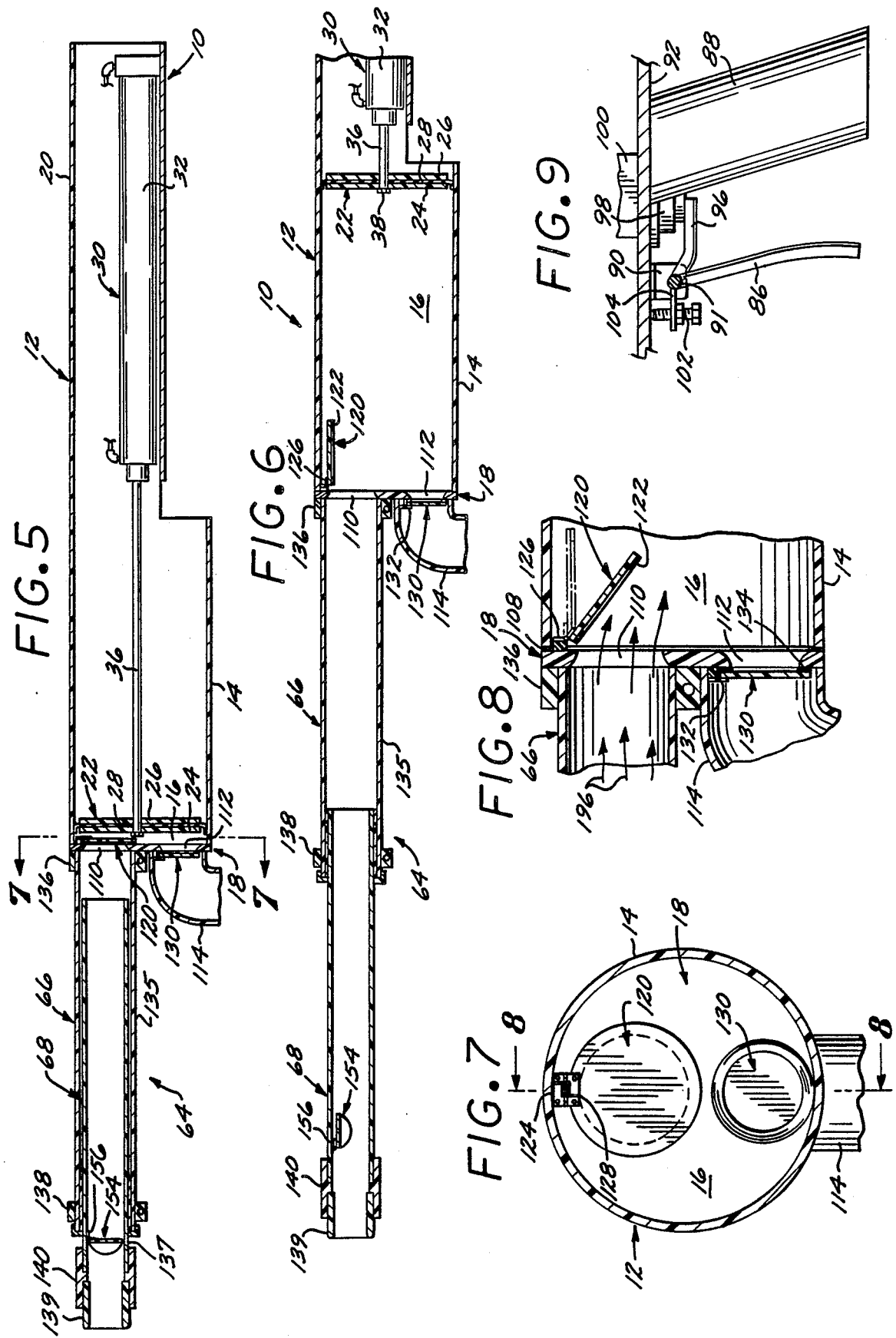

UNDERWATER SPECIMEN COLLECTING DEVICE

BACKGROUND OF THE INVENTION

1. Field of the Invention

The present invention relates to an improved pneumatically operated device for collecting live biological specimens beneath the surface of a body of water.

2. Description of the Prior Art

There are many instances in which live, biological specimens are required to enhance the knowledge available concerning fish and other marine and aquatic creatures. While some specimens may be captured live with baited traps lowered into a body of water and left for later collection, this collection method is often unsatisfactory. Such unattended traps are not specific to any particular species of marine or aquatic life so that an ichthyologist has very little control over the particular species, if any, which will be attracted to the traps. Furthermore, it is often difficult to determine locations under water which are frequented by a species of interest. It is therefore difficult to place an unattended trap so that specimen collection is likely to be successful.

Live specimen collection is more effectively conducted by a diver who actually enters a body of water and personally selects and collects a specimen of interest. Virtually all diving of this type which requires underwater observation for extended periods is performed with self-contained life supporting tanks, masks, and wet suits, commonly referred to as scuba equipment.

One of the simplest specimen collection aids to a diver is a net, the edges of which are held apart by a circular hoop which is mounted on an elongated handle. The diver can attempt to scoop a specimen up in a net, manually close off the mouth of the net to prevent a specimen from escaping, and attempt to transfer the live specimen to a collection container. However, collection attempts using a net are frequently unsuccessful.

Another device which was developed for the purpose of collecting live biological specimens is an implement known as a "slurp gun". The description of one embodiment of a slurp gun appears in an article entitled "a pneumatically operated slurp gun", authored by J. Ross Wilcox, Robert P. Meek and David Mook which appeared in the publication *Limnology and Oceanography*, Vol. 19, No. 2, March 1974, pages 354–355.

A slurp gun operates on the same principle as a syringe. That is, a plunger is retracted within a cylindrical tube under water to rapidly draw a volume of water into a receiving chamber through an intake. A nozzle at the intake or mouth of the receiving chamber is positioned as closely as possible to a live biological specimen of interest, and the plunger is retracted within the tube under the control of a pneumatic cylinder. A pneumatic cylinder is coupled to operate the plunger and is pneumatically connected to a conventional scuba tank containing compressed air through a three way control valve.

In a first position the control valve allows a compressed volume of air to return the plunger to a position proximate to the receiving chamber intake. A trigger mechanism on the control valve is employed to move the valve to a second position in which compressed air under a significantly greater pressure is introduced into the opposite chamber of the pneumatic cylinder. The plunger is thereupon retracted within the tube to suck in a volume of water through the intake. If a live biological specimen of interest is located close enough to the nozzle, it will be carried into the receiving chamber through the intake upon actuation of the plunger.

In a third position the control valve allows air to be bled from the highly pressurized chamber of the pneumatic cylinder. When pressure drops below the pressure in the opposing chamber, the pressure in the opposing chamber operates against the pneumatic piston, which in turn returns the plunger to a position proximate to the receiving chamber intake in preparation for a subsequent specimen collection attempt.

While some success in live biological specimen collection has been achieved with slurp guns of a conventional design, such as that described, several distinct problems exist in the use of such devices. It is frequently very difficult to position the nozzle of a conventional slurp gun close enough to a biological specimen of interest for a sufficient suction force to be exerted to draw the specimen into a receiving chamber. The approach of the nozzle will often cause the creature of interest to swim away. As a result, the suctional force exerted on the specimen is inadequate or misdirected, and the creature is not drawn into the slurp gun at all. On other occasions the live specimen is drawn only partially into the device, and is able to rapidly escape once the initial suction force has abated. A further deficiency of conventional slurp guns exists in that the inlet remains open at all times, and the entrapped specimen is likely to escape through it even if the slurp gun has been successfully operated to effectuate an initial capture.

SUMMARY OF THE INVENTION

One principal object of the present invention is to provide an improvement to a slurp gun which greatly enhances the rate of success in attempting to capture and retain live biological specimens, such as fish. This objective is achieved by providing the slurp gun with a nozzle that has a movable end remote from the intake to the specimen receiving chamber. According to the improvement a pneumatic nozzle activator is provided to operate the movable end of the nozzle in reciprocation in tandem with the plunger and in a direction opposite to movement of the plunger. That is, as the plunger is retracted rearwardly within the suction tube, the movable end of the nozzle is extended forwardly toward the specimen of interest. As a consequence, the suctional force generated by movement of the plunger is focused more directly and effectively upon the specimen of interest. The fish or other creature to be captured is therefore more likely to be drawn into the nozzle.

Another object of the invention is to provide means for restricting the possibility of escape of a live specimen once the creature has been drawn into the improved slurp gun of the invention. This is achieved by providing the movable element of the nozzle with a flapper valve which opens wide to allow relative liquid flow through the nozzle and toward the intake to the receiving chamber, but which closes to block flow should the liquid begin to flow outwardly through the nozzle away from the intake. Thus, a specimen which has been drawn only partially into the device by an initial operation of the plunger will not escape, but will be temporarily trapped within the nozzle between the flapper valve and the intake to the receiving chamber. A subsequent operation of the plunger will then draw the specimen entirely into the receiving chamber.

To further restrict the likelihood of escape of a captured specimen, another flapper valve is provided at the intake to the specimen receiving chamber. This flapper valve likewise will open wide to admit liquid flowing from the nozzle through the inlet into the receiving chamber, but will promptly close should the direction of liquid flow be reversed.

Another object of the invention is to provide a means for quickly and easily transferring a captured specimen from the receiving chamber of the specimen collecting device into a specimen collecting container. A specimen collecting container is preferably positioned proximate to the intake end of the suction tube and in communication therewith through a collection port located therebetween. Yet another flapper valve is located at the collection port and opens when the plunger moves toward the intake and closes when the plunger moves away from the intake.

Once a specimen has been trapped within the specimen receiving chamber, the plunger is moved by a pneumatic return control means back toward the intake. This creates a movement of liquid toward the nozzle which will immediately close the flapper valve located at the receiving chamber intake. Concurrently, the flapper valve located at the collection port will open, thereby causing the contents of the receiving chamber to be emptied into the specimen collecting container. The live collected specimen is thereby carried by the flowing liquid through the collecting port and into the specimen collection container. The entrapped specimen will remain in the collection container, since a subsequent retraction of the plunger will cause the flapper valve at the collecting port to close.

A further object of the invention is to provide a return or recocking mechanism by means of which the plunger will be returned to a ready position regardless of the depth at which the device is operated. Both the plunger and the movable element of the nozzle are returned in a direction toward the inlet because both the plunger actuating pneumatic cylinder and the nozzle actuating pneumatic cylinder or cylinders are provided with pneumatic reservoirs. These pneumatic reservoirs respectively urge the plunger and the movable element of the nozzle toward the inlet to the receiving chamber once the actuating pressure which creates a suction into the receiving chamber diminishes by reason of venting of air through bleed valves. In conventional slurp guns, however, the extent to which the plunger will return, and the extent to which the plunger will be retracted, are both affected by the ambient water pressure. Water pressure will vary considerably, of course, with variations in depth of operation.

Accordingly, both the plunger actuating pneumatic cylinder and the nozzle actuating pneumatic cylinder are provided with an adjustable pressure regulator. By regulating the pressure to the pneumatic reservoirs associated with the plunger actuator and the nozzle actuator, the length of the return strokes of the plunger and the movable nozzle element can be controlled and maintained at a maximum at any desired depth of operation.

In order for the plunger actuating piston and the nozzle actuating piston to return to their ready positions, the actuating air charge to both of the pistons must be exhausted. Thus, an exhaust line is provided from the control valve for the system. However, in a conventional slurp gun some water is sucked into the actuating cylinders during each operation of the plunger. A buildup of water within the actuating pneumatic cylinders decreases and alters the effectiveness of the actuating stroke. To remedy this problem the improved slurp gun of the invention is equipped with a check valve in the exhaust line. The exhaust line check valve closes the exhaust line during retraction of the plunger and prevents water from being drawn into the pneumatic actuating cylinders.

In one broad aspect the present invention may be considered to be an improvement in a pneumatically operated device for collecting live biological specimens under water in a receiving chamber which employs a pneumatically operated plunger for creating a suction at an intake to the receiving chamber. The improvement of the invention is comprised of a nozzle having a movable end remote from the intake and a pneumatic nozzle activator operated in tandem with the plunger to extend the movable nozzle end away from the intake when the plunger creates a suction at the intake.

In another broad aspect the present invention may be considered to be an improvement to a device for collecting live biological specimens under water which has a plunger disposed for reciprocation within a suction tube defining a specimen receiving chamber and having a specimen inlet and within which the plunger is moveable within the tube and away from the inlet to create a suction at the inlet into the receiving chamber. The device also employs a pneumatic plunger actuator means for moving the plunger.

According to the improvement of the invention, a nozzle at the inlet is provided with a movable element which is retractable toward the inlet and alternatively extendable away from the inlet. The improvement also includes a pneumatic nozzle control means which operatively connects the movable element of the nozzle to the pneumatic actuator means to operate the movable element in tandem with the plunger to concurrently create suction at the inlet and extend the movable nozzle element away from the inlet.

The invention may be described with greater clarity and particularity by reference to the accompanying drawings.

DESCRIPTION OF THE DRAWINGS

FIG. 5 is a side elevational sectional view taken along the lines 5—5 of FIG. 1 and showing the movable end of the nozzle of the device in a retracted position.

FIG. 6 is a sectional elevational view corresponding to FIG. 5 and showing the movable end of the nozzle in an extended position.

FIG. 7 is a transverse sectional detail taken along the lines 7—7 of FIG. 5.

FIG. 8 is a longitudinal sectional detail taken along the lines 8—8 of FIG. 7.

FIG. 9 is an elevational detail taken along the lines 9—9 of FIG. 2.

DESCRIPTION OF THE EMBODIMENT

Figure 1:
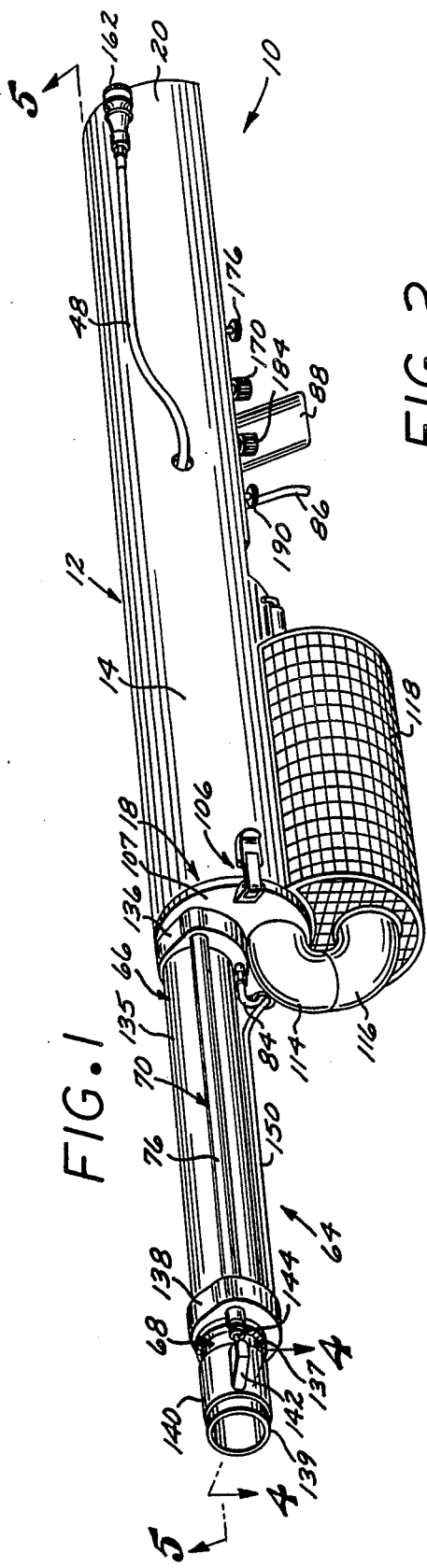
FIG. 1 is a perspective view of a preferred embodiment of a live specimen collection device designed for underwater use and improved according to the invention.

FIG. 1 illustrates an improved slurp gun 10 according to the invention. The slurp gun 10 is a device for collecting live biological specimens under water. The device 10 is comprised of an elongated, transparent, rigid plastic pipe 12, the forward end 14 of which forms a cylindrical suction tube 14 that defines a receiving chamber 16 therewithin and which has an intake end 18, as best depicted in FIG. 6. The underside of the pipe 12 is longitudinally cut away at the end thereof remote from the intake end 18, so that the rear portion 20 of the pipe 12 is of a semi-cylindrical configuration having a semicircular annular cross section. A disk shaped plunger 22 is formed by a pair of circular plastic disks 24 and 26 with a rubber gasket 28 therebetween. The plunger 22 is disposed for longitudinal reciprocation within the suction tube 14.

A pneumatic plunger actuator 30 is provided and includes a plunger actuating cylinder 32 secured relative to the suction tube 14 and a plunger actuating piston 34 therewithin. The plunger 22 is slaved to move with the plunger actuating piston 34 (FIG. 10) by means of the piston rod 36 which extends through a pneumatic seal at one end of the plunger actuating cylinder 32. The piston rod 36 is secured to the plunger 22 by a bolt 38.

Figure 10:
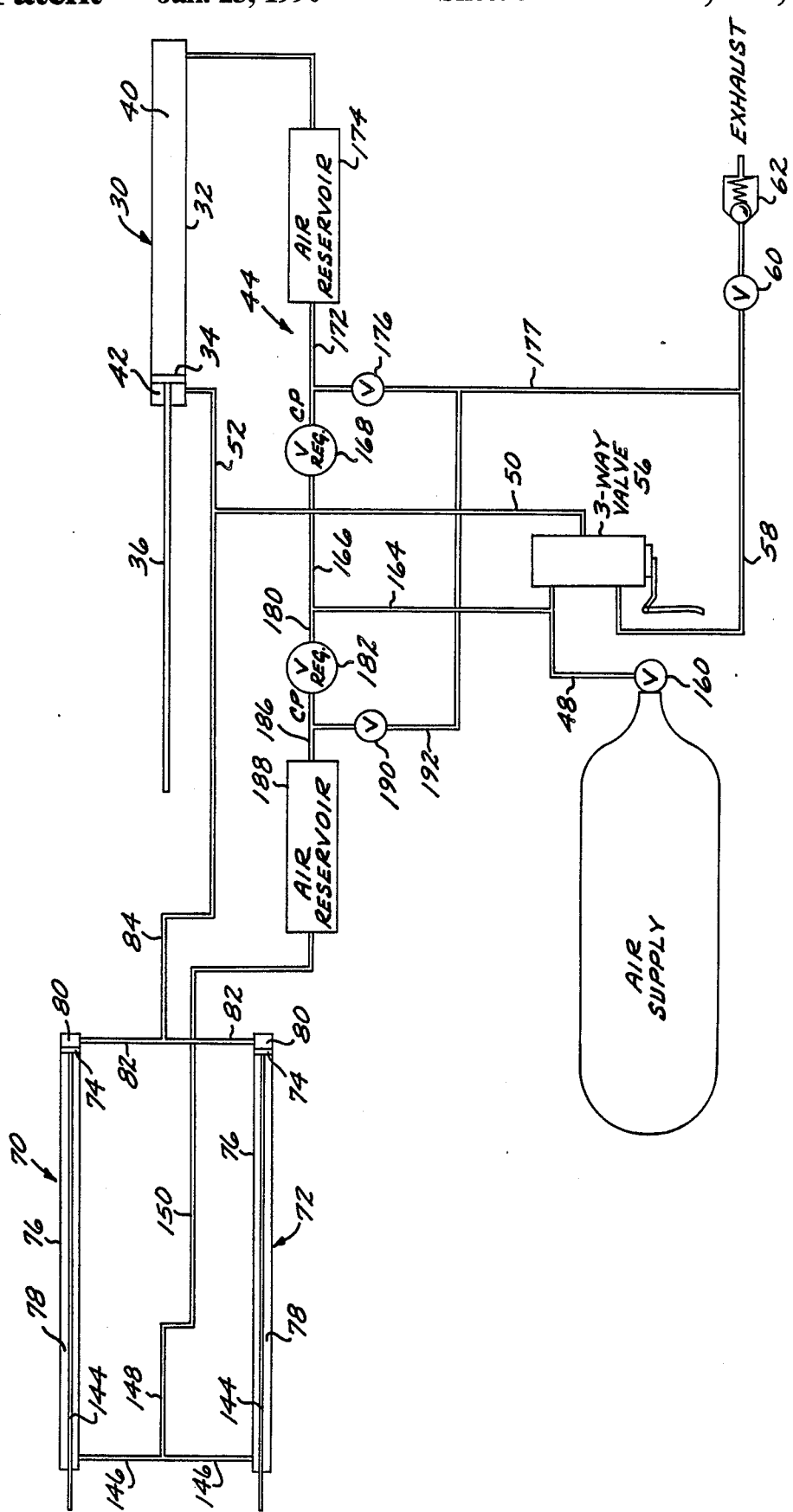
FIG. 10 is a schematic diagram showing the pneumatic actuating systems of the device of FIG. 1.

As illustrated in FIG. 10, the piston 34 divides the pneumatic plunger actuating cylinder 32 into first and second pneumatic plunger control chambers 40 and 42. The plunger actuating piston 34 is movable in longitudinal reciprocation within the pneumatic plunger actuator cylinder 32 and is operatively connected to the plunger 22 to reciprocate the plunger 22 in tandem therewith.

A pneumatic pressurizing means 44 is connected to the first chamber 40 of the pneumatic actuator 30 to bias the plunger actuating piston 34 so as to urge the plunger 22 toward the intake end 18 of the suction tube 14, as depicted in FIG. 5. A second pneumatic pressure source 46 is pressurized to a pressure greater than that of the pneumatic pressurizing means 44. A pneumatic control connecting line includes pneumatic supply ducts 48, 50 and 52 which lead from the pneumatic pressure source 46 to the second plunger control pneumatic chamber 42 of the pneumatic actuator 30.

The device 10 is also comprised of a control valve means in the form of a three way valve 56 which is connected in the pneumatic control connecting line between the pneumatic ducts 48 and 50. The three way valve 56 is alternatively operable to a first position in which the pneumatic pressure source 46 is isolated from the second plunger control pneumatic chamber 42, a second position in which the pneumatic pressure source 46 is in communication with the second plunger control pneumatic chamber 42, whereby the plunger 22 is forced away from the inlet end 18 of the suction tube 14, as depicted in FIG. 6, and a third position in which the pneumatic pressure source 46 is isolated from the second plunger control pneumatic chamber 42, and in which the second plunger control pneumatic chamber 42 is externally vented. Venting of air from the chamber 42 is through an exhaust line 58, an adjustable valve 60 which controls the rate of release of pressure from the chamber 42, and a check valve 62.

A principal feature of the improved specimen collecting device 10 resides in the provision of a nozzle mechanism 64 having a fixed element 66 coupled to the intake end 18 of the suction tube 14 and an opposite movable element or end 68, as well as a pneumatic nozzle actuator means in the form of a pair of nozzle control actuators 70 and 72 which operatively connect the movable element 68 of the nozzle 64 to the three way valve 56.

Each of the pneumatic nozzle actuators 70 and 72 is provided with a plunger control pneumatic piston 74 disposed for reciprocation within a nozzle control pneumatic cylinder 76. The nozzle control pneumatic pistons 74 thereby divide each of the nozzle control pneumatic control cylinders 76 into a first nozzle control pneumatic chamber 78 and a second nozzle control pneumatic chamber 80.

The second nozzle control pneumatic chambers 80 are connected by branch lines 82 to a common branch line 84 which in turn is in open communication with pneumatic ducts 50 and 52. The movable element 68 of the nozzle 64 thereby moves in tandem with the plunger 22 and away from the inlet end 18 of the suction tube 14 when the three way control valve 56 is in the second position hereinbefore described.

Figure 2:
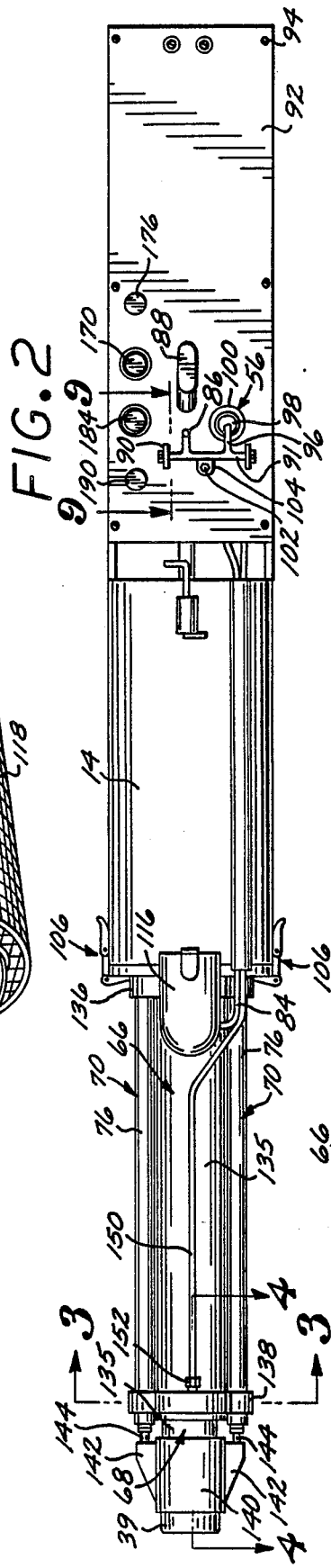
FIG. 2 is a bottom plan view of the device of FIG. 1.

The control valve 56 is spring biased to the first position, hereinbefore described, and may be a spool type valve. The control valve 56 may be moved to the second and third positions by squeezing a trigger lever 86 toward a gripping handle 88. The trigger lever 86 and the trigger handle 88 are best depicted in FIGS. 2 and 9. The trigger lever 86 is rotatably mounted relative to a pair of mounting brackets 90 that are secured to the underside of a transverse, rectangular control mounting panel 92 by means of an axle 91. The mounting panel 92 is secured to the cutaway edges of the rear portion 20 of the transparent pipe 16 by screws 94, as depicted in FIG. 2.

The trigger lever 86 rotates relative to the mounting brackets 90 to rotate the transverse axle 91, which in turn carries the valve depressing lever 96. Together, the trigger lever 86, the axle 91 and the valve depressing lever 96 operate as a bell crank mechanism to longitudinally shift the spool 98 within the spool valve housing 100 of the three way control valve 56. The spool 98 of the control valve 56 can be adjusted relative to the valve housing 100 by means of the adjusting screw 102 which is threadably engaged in a tang 104 that extends radially outwardly from the shaft 91. The tip of the spool valve adjusting screw 102 bears against the control mounting panel 102, as depicted in FIG. 9.

The transverse disk shaped suction tube end 18 is held in position against the forward circular transverse annular edge of the suction tube 14 by a pair of latching clasps 106, located on opposite sides of the forward end of the tube 12. The latching clasps 106 engage corresponding lugs (not visible) on the exterior face 107 of the suction tube 14 in a conventional manner. An annular gasket 108 provides a liquid tight seal between the forward edge of the pipe 20 and the interior surface of the transverse end 18 of the suction tube 14, as illustrated in FIG. 8.

As best illustrated in FIGS. 7 and 8, a specimen intake 110 is defined in the inlet end 18 of the suction tube 14 in the form of a circular port. A circular collection port 112 is also located at the intake end 18 of the suction tube 14 proximate to the specimen intake 110. A hollow ninety degree plastic elbow 114 is secured to the exterior face 107 of the suction tube 14. The downwardly facing end of the elbow 114 resides in abutment and in alignment with the upwardly facing end of another hollow ninety degree plastic elbow 160. The other end of the elbow 160 is connected to the forwardly facing end of a generally cylindrical specimen collecting container 118 that is mounted on the device 10 beneath the suction tube 14.

As illustrated in FIGS. 7 and 8 an intake flapper valve 120 is located at the intake 110. The intake flapper valve 120 is formed of a circular plastic disk having an annular rubber gasket 122 on its peripheral margin facing the inlet end 18 of the suction tube 14. The flapper valve 120 is attached to the interior face of the inlet end 18 by means of a hinge 124 that is mounted on a spacer block 126. The intake flapper valve 120 is biased toward a closed position by a light coil spring 128, as depicted in FIGS. 7 and 5, with the gasket 124 sealing the intake 110 in a substantially liquid tight manner. The intake flapper valve 120 opens as depicted in FIGS. 8 and 6 when the plunger 22 moves away from intake 110, and closes when the plunger 22 moves toward the intake 110, to the position depicted in FIGS. 7 and 5.

A similar collection port flapper valve 130 is located at the collection port 112, but is mounted in a manner opposite to the intake flapper valve 120. That is, the collection port flapper valve 130 is mounted on the exterior face 107 of the inlet end 18 of the suction tube 14 by means of a hinge 132. The collection port flapper valve 130 is likewise spring biased to the closed position depicted in FIGS. 6 and 8 and includes a sealing gasket 134 which bears against the exterior face 107 of the inlet end 18 when the collection port flapper valve 130 is closed. The collection port flapper valve 130 opens when the plunger 22 moves toward the intake 110, and closes when the plunger 22 moves away from the intake 110.

The collection port flapper valve 130 thereby permits liquid flow into the collecting container 118 through the collection port 112. However, the collection port flapper valve 130 blocks liquid flow into the receiving chamber 16 through the collection port 112. The intake flapper valve 120, on the other hand, permits liquid flow into the receiving chamber 16 through the intake port 110, and blocks liquid flow through the intake port 110 toward the nozzle 64.

The nozzle 64 is comprised of a pair of coaxial telescoping elements 66 and 68. The fixed element 66 is comprised of an outer transparent clear plastic tube 135 which is fixed in position relative to the suction tube 14 by means of a surrounding collar 136. The collar 136 is solvent welded to both the end extremity of the outer fixed tube 135 and to the exterior face 107 of the inlet end 18. A similar collar 138 is likewise solvent welded to the outer surface of the end of the fixed tube 135 that is located remote from the inlet end 18.

Figure 3:
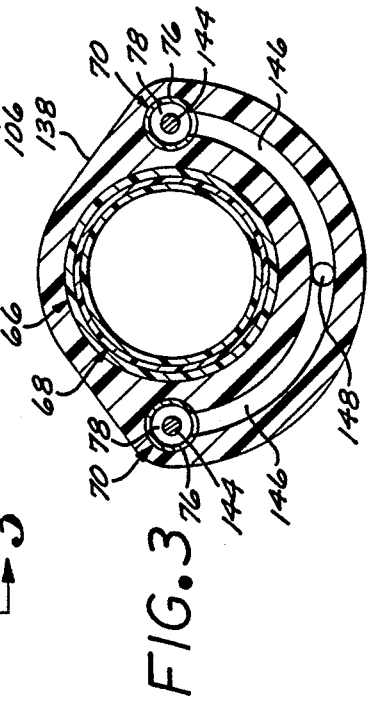
FIG. 3 is a transverse sectional detail taken along the lines 3—3 of FIG. 2.

The collar 138 is fabricated with internal, arcuate ducts 146 which emanate from a common longitudinal supply duct 148, as depicted in FIG. 3, and which intersect the first nozzle control pneumatic chambers 78 of both of the pneumatic nozzle control cylinders 76 of both of the nozzle control actuators 70, as depicted in FIG. 10. A common pneumatic supply line 150 is connected to a fitting 152 at the supply duct 148 in the collar 138.

The opposing ends of both of the nozzle control pneumatic cylinders 76 are secured within longitudinally aligned openings in the collars 136 and 138 radially outwardly from the concentric elements 66 and 68 diametrically opposite each other. The collars 136 and 138 thereby secure the nozzle control cylinders 76 and the fixed tube 135 of the nozzle 64 rigidly to the suction tube 14.

The movable element 68 of the nozzle 64 is comprised of an inner telescoping tube 137, an annular connecting collar 140, and a short cylindrical annular tip 139. The annular collar 140 is solvent welded to the extremity of the inner, movable tube 137 of the nozzle 64. The collar 140 is provided with a pair of radially extending ears 142 to which the extremities of the piston rods 144 of the nozzle control pneumatic pistons 74 are connected, as best depicted in FIGS. 1 and 2. The opposite ends of the piston rods 144 are secured to their respective nozzle control pneumatic pistons 74.

Figure 4:
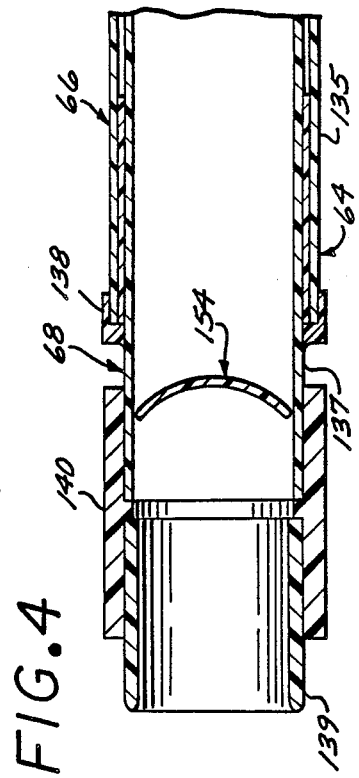
FIG. 4 is a longitudinal sectional detail taken along the lines 4—4 of FIG. 2.

As best illustrated in FIGS. 4, 5 and 6, a nozzle flapper valve 154 is located in the movable end 68 of the nozzle 64, and is formed as a curved gate attached to the interior wall of the movable tube 137 proximate to the tip 139 by means of a hinge 156. While the nozzle flapper valve 154 does extend transversely across the entire opening defined within the movable tube 137, it is curved to conform as closely as possible to the curved surface of the interior wall of the movable tube 137 when fully opened, as depicted in FIG. 6. A nozzle flapper valve configured in this manner will minimize the obstruction created to liquid flow from the tip 139 of the movable element 68 of the nozzle 64 when the movable element 68 is extended from the fixed tube 135, as depicted in FIG. 6.

The nozzle flapper valve 154 is spring loaded but does not require a sealing gasket. The nozzle flapper valve 154 permits liquid flow therethrough toward the intake 110. The nozzle flapper valve 154 also blocks liquid flow therethrough in a direction away from the intake 110 and toward the tip 139. The nozzle flapper valve 154 thereby opens when the movable element 68 of the nozzle 64 is extended away from the intake 110 in the manner depicted in FIG. 6.

The pneumatic operating system which operates both the pneumatic plunger actuator 30 and the pneumatic nozzle actuators 70 and 72 is depicted schematically in FIG. 10. The pneumatic pressure source 46 is preferably a conventional scuba tank with a typical output pressure of 150 pounds per square inch. The tank 46 has a conventional tank regulator 160 at its mouth.

The pneumatic duct 48 terminates in a quick disconnect fitting 162 which couples in mating engagement with the outlet of the scuba tank valve 160.

The pneumatic duct 48 leads from the scuba tank valve 160 to the three way control valve 56, but is provided with a branch duct 164. The branch duct 164 connects the pneumatic pressure tank 46 to the pneumatic nozzle control actuators 70 and 72 and to the first pneumatic chamber 40 of the plunger actuating cylinder 32. The duct 164 intersects a branch duct 166 which leads to an adjustable plunger pressure reducing valve 168. The pressure reduction effectuated by the pressure reducing valve 168 is controlled by the valve control knob 170 on the control panel 92.

While the pressure reduction required by the pressure reducing valve 168 will vary with the depth at which the device 10 is operated, the pressure reducing valve 168 in the return control duct 166 drops the pressure of approximately 150 psi from the air supply tank 46 to a reduced pressure, on the order of 2 psi, in the pneumatic return control duct 172. The pressure in the return control duct 172 is still an elevated plunger return pressure, and will return the plunger actuating piston 34 to a position proximate to the intake end 18 of the suction tube 14, in the absence of a greater pressure in the second plunger control pneumatic chamber 42.

The return duct 172 communicates with the first plunger control pneumatic chamber 40 through a pneumatic reservoir 174, which may take the form of a coiled length of pneumatic tubing interposed between the plunger pressure reducing valve 168 and the first plunger control pneumatic chamber 40 of the plunger actuating cylinder 32. A pneumatic bleed off valve 176 is provided in an exhaust duct 177 that branches from the return duct 172 to externally vent pneumatic pressure from the plunger return control reservoir 174 if pressure within the reservoir 174 is too great.

In a similar manner the pneumatic return control duct 164 also branches to a nozzle return control duct 180 which leads to another pressure reducing valve 182. The pressure regulating valve 182 reduces pressure to the nozzle control actuators 70 and 72. The pressure regulating valve 182 may be adjusted by means of an adjustment knob 184 on the control panel 92. Again, while the requisite pressure at the outlet of the pressure regulating valve 182 in the nozzle return control duct 186 will vary with depth and volume of air in the nozzle return control ducting, the pressure regulating valve 182 typically reduces the pneumatic pressure of approximately 150 psi from the air supply tank 46 to a pressure on the order of 2 psi at the nozzle return control duct 186.

The nozzle return control duct 186 leads to a nozzle return control reservoir 188, which likewise may be formed by a coiled length of pneumatic duct line interposed between the nozzle pressure reducing valve 182 and the first nozzle control pneumatic chambers 78 of the nozzle actuating cylinders 76. The pneumatic reservoir 188 is connected to the common pneumatic supply line 150. A nozzle return pressure bleed off valve 190 is connected in a bleed off line 192 for externally venting pneumatic pressure from the nozzle return control reservoir 188.

The nozzle actuating ducts 180, 186 and 150, the nozzle control reservoir 188 and the nozzle pressure regulating valve 182 are all coupled between the three way control valve 56 and the nozzle control cylinders 76 to conduct pneumatic pressure from the pneumatic pressure source tank 46 to the first nozzle control pneumatic chambers 78 in the nozzle control pneumatic cylinders 76. The nozzle actuating ducts 50, 82 and 84, on the other hand, are coupled between the three way control valve 56 and the nozzle control cylinders 76 to conduct pneumatic pressure from the air supply pneumatic pressure source tank 46 to the second nozzle control pneumatic chambers 80 of the nozzle control cylinders 76 when the three way control valve 56 is operated to the second position, hereinbefore described. The nozzle pressure regulating valve 182 is interposed between the pneumatic pressure source 46 and the first nozzle control pneumatic chambers 78 of the nozzle control cylinders 76.

In the embodiment illustrated, the nozzle control cylinders 76 are secured relative to the suction tube 14 and the nozzle control pistons 74 are secured relative to the movable element 68 of the nozzle 64. It should be understood, however, that with a relatively simple pneumatic circuit design change the nozzle control cylinders 76 could be secured to the movable element 68 of the nozzle 64, while the nozzle control pistons 74 could be secured relative to the suction tube 14.

System Operation

To utilize the improved biological specimen collecting device 10, a user, equipped with personal life support equipment, descends to a desired depth in water at which the device 10 is to be operated. Many marine specimens of interest may be found between depths of from approximately 5 to 100 feet, although the device 10 may be utilized at any depth.

The device 10 may be operated from the user's own personal pressurized life support air supply tank 46. To utilize the device 10 in this manner it is necessary to connect a Y fitting to the valve 160. The quick disconnect fitting leading to the pressure regulator in the user's mouthpiece is connected to one branch of the Y fitting, while the quick disconnect fitting 162 on the high pressure air supply duct 48 is connected to the other branch of the Y fitting. Alternatively, the device 10 may be operated from an independent air supply tank 46. If the device 10 is operated from an independent air supply tank 46, the high pressure air supply duct 48 should be a flexible air hose having a length of between about seven to ten feet in order to give the user a reasonable range of operation without having to carry the extra air tank 46.

When the user has reached the desired depth of operation the pneumatic controls should be adjusted so that the plunger 22 and the movable element 68 of the nozzle 64 travel between fully extended and fully retracted positions. The travel of the plunger 16 is controlled by the pressure regulating valve 168. The countervailing pressure that exists in the first plunger control pneumatic chamber 40 when the second pneumatic control chamber 42 is pressurized will determine the length of the stroke of the plunger 16 when suction is applied to the intake 110. The volume of the air reservoir 174 will also affect the length of the stroke, and air reservoirs having different volumes may be required when operation is to be conducted between extremely different depths.

Pressure to the first plunger control pneumatic chamber 40 may be increased or decreased by manipulation of the pressure regulator valve control knob 170 on the control panel 92. If too much back pressure is developed in the first plunger control pneumatic chamber 40, pressure can be bled therefrom by means of the bleed valve 176.

The proper stroke of the plunger 16 may be established by practice operation of the device 10. The trigger lever 86 is pulled to bring the three way valve 56 to its second position, wherein pressure is applied to the second plunger control pneumatic chamber 42. The piston 34 thereupon travels rapidly toward the first plunger control pneumatic chamber 40, reducing the volume of that chamber until the back pressure in the air reservoir 174 equalizes pressure in the first and second plunger control pneumatic chambers 40 and 42, respectively. If the plunger 16 does not travel far enough to the rear of the suction tube 14, pressure is bled from the pneumatic reservoir 174 by adjusting the regulator 168 and opening the valve 176 briefly. If the plunger 22 does not return far enough toward the inlet end 18 during the subsequent return stroke, the pressure regulator valve 168 is opened by means of the valve regulating knob 170 to increase pressure in the pneumatic reservoir 174.

Similarly, the stroke of the movable element 68 of the nozzle 64 is likewise empirically established. If the movable element 68 does not travel far enough forward away from the intake 110, pneumatic pressure is bled from the system through the bleed valve 190. If the movable portion 68 does not return sufficiently into a fully retracted position, as depicted in FIG. 5, the pressure regulating valve 182 is operated by means of the valve control knob 184 to increase pressure to the air reservoir 188.

Once the proper strokes of both the plunger 16 and the movable element 68 of the nozzle 64 have been established, the device 10 is ready for use to capture live specimens, such as small fish. The user carries the device 10 by gripping the handle 88 with one hand. The forward portion of the device 10 can be guided with the other hand to position the mouth of the tip 139 as close as possible to a specimen of interest The trigger lever 86 is then pulled, thereby moving the three way control valve 56 from its first position, in which a pneumatic pressure source in the form of the air tank 46 is isolated from the second plunger control pneumatic chamber 42, to a second position in which pneumatic pressure is conducted from the pneumatic pressure source 46 to the second plunger control pneumatic chamber 42 of the plunger actuating cylinder 32. The sudden pressurization of the second chamber 42 to a pressure higher than that of the chamber 40 causes the piston 34 to rapidly retract toward the first chamber 40. The plunger 16 is operated in tandem with the piston 34, and likewise retracts from the position of FIG. 5 to that of FIG. 6.

The movable element 68 of the nozzle 64 is operated in tandem with the plunger 16. That is, movement of the trigger lever 86 to bring the three way control valve 56 to its second position not only retracts the plunger 16, but also extends the movable element 68 of the nozzle 64. This is because the elevated pressure of the air supply tank 46 is supplied through line 50, both through line 52 to the second plunger control pneumatic chamber 40, and also through line 84 to the second nozzle control pneumatic chambers 80. The sudden pressurization of the chambers 80 causes the pistons 74 to move rapidly toward the first nozzle control pneumatic chambers 78. The piston rods 144 thereby extend the movable element 68 of the nozzle 64 to concentrate the suction force generated by the plunger 22 directly upon the specimen of interest.

The live biological creature of interest is not only subjected to a sucking action, due to the rapid movement of water through the intake 110 into the receiving chamber 16, but also the sucking action is concentrated directly upon the specimen of interest, since the movable element 68 of the nozzle 64 approaches, and sometime even encompasses the creature. There is therefore a considerable likelihood that the specimen of interest will be drawn through the nozzle 64, through the intake 110 and into the receiving chamber 16 with the liquid flow as indicated by the directional lines 196 in FIG. 8.

If the specimen of interest resists the liquid flow sufficiently so as to avoid being swept into the receiving chamber 16, it will nevertheless, in all likelihood, be entrapped within the extended nozzle 64. As the three way control valve 56 is moved to its third position in which pneumatic pressure is vented from the second plunger control chamber 42 and the second nozzle control chambers 80 through the exhaust release control valve 60 and the check valve 62, both the plunger 16 and the movable element 68 of the nozzle 64 will begin to return toward their original positions of FIG. 5. As soon as the movable portion 68 of the nozzle 64 begins to return toward the intake end 18, the water pressure within the confines of the nozzle 64 will force the nozzle flapper valve 54 to close immediately. Thus, a marine specimen of interest which has not been swept into the receiving chamber 16 through the intake 110 will nevertheless be entrapped within the confines of the nozzle 64 between the flapper valves 120 and 124. A second subsequent firing of the trigger lever 86 will then almost certainly cause the specimen of interest to be swept into the receiving chamber 16, due to the high force of suction which will then be applied within the confines of the nozzle 64.

Once the specimen of interest has been carried into the receiving chamber 16, it cannot escape and can be automatically transferred to the specimen collection receptacle 118 which is disposed in communication with the specimen receiving chamber 16 through the specimen collection port 112. That is, as the three way valve control 56 is manipulated to its third position, the return of the plunger 22 within the suction tube 14 toward the inlet end 18 ends to increase pressure within the receiving chamber 16. The intake flapper valve 120, even if not completely closed by the force of the spring 128, will thereupon fully close, thereby preventing the specimen of interest from escaping through the intake 110 and out of the nozzle 64. At the same time, the return of the plunger 16 causes the collection port flapper valve 130 to open. Water, which is substantially incompressible, then is able to flow out of the diminishing volume of the receiving chamber 16 and through the collection port 112.

The entrapped specimen of interest is carried with the flow of water out of the receiving chamber 16, through the collection port 112 and through the juxtaposed ninety degree elbows 114 and 116 and into the specimen collection receptacle 118. The specimen collection receptacle 118 may either be a transparent enclosure having a water outlet guarded by a strainer to prevent the specimens of interest from escaping, or it may be a cage-like structure, formed for example, of wire mesh. With either construction the water, which enters the collection receptacle 118 from the receiving chamber 16, will pass freely through the collection receptacle 118, although the live biological specimen of interest will be entrapped therewithin.

Undoubtedly, numerous variations and modifications of the invention will become readily apparent to those familiar with pneumatically operated devices and underwater biological specimen collection. For example, in the preferred embodiment illustrated the nozzle 16 is formed of a fixed, rigid cylindrical tube 135 and a movable rigid tube 137 telescopically engaged therewithin. However, numerous different nozzle configurations could be employed. For example, the nozzle could be fabricated in the form of a rubber boot, one end of which is fixed relative to the intake end 18 of the device 10 and the other end of which is extendable therefrom under pneumatic control. Alternative, the nozzle could be constructed in a bellows type configuration in which the nozzle can be retracted, with the walls thereof folding together in an accordion like configuration, and alternatively extended to a nearly cylindrical configuration. The fundamental principle of the nozzle is that it includes laterally confining walls and a movable end that can be extended outwardly from a fixed end to concentrate suction force upon the live biological specimen of interest.

Accordingly, the scope of the invention should not be construed as limited to the specific preferred embodiment of the invention depicted and described herein, but rather is defined in the claims appended hereto.

I claim:

1. In a device for collecting live biological specimens under water in a receiving chamber and which employs a pneumatically operated plunger for creating a suction at an intake to said receiving chamber, the improvement comprising a nozzle having a movable end remote from said intake and a pneumatic nozzle activator operated in tandem with said plunger to extend said movable nozzle end away from said intake when said plunger creates a suction at said intake.

2. A device according to claim 1 further comprising a nozzle flapper valve located within said movable end of said nozzle and which opens when said movable end is extended away from said intake.

3. A device according to claim 1 in which said receiving chamber is defined within a cylindrical suction tube having an intake end which defines said intake and said plunger is movable in longitudinal reciprocation within said suction tube, and further comprising an intake flapper valve located at said intake which opens when said plunger moves away from said intake and closes when said plunger moves toward said intake.

4. A device according to claim 3 further comprising a specimen collecting container, a collection port located at said intake end of said suction tube and in communication with said specimen collecting container, and wherein said collection port opens when said plunger moves toward said intake and closes when said plunger moves away from said intake.

5. A device according to claim 1 wherein said pneumatic nozzle activator is comprised of a nozzle actuating cylinder means and nozzle actuating piston means longitudinally reciprocal within said nozzle actuating cylinder means, and one of said nozzle actuating piston and cylinder means is secured relative to said movable end of said nozzle and the other of said nozzle actuating piston and cylinder means is secured relative to said receiving chamber.

6. An improvement to a device for collecting live biological specimens under water which has a plunger disposed for reciprocation within a suction tube defining a specimen receiving chamber and having a specimen inlet and in which said plunger is movable within said tube and away from inlet to create a suction at said inlet into said receiving chamber and pneumatic plunger actuator means for moving said plunger, comprising a nozzle at said inlet having a movable element which is retractable toward said inlet and alternatively extendable away from said inlet, and pneumatic nozzle control means which operatively connects said movable element to said pneumatic actuator means to operate said movable element in tandem with said plunger to concurrently create suction at said inlet and extend said movable nozzle element away from said inlet.

7. An improved device according to claim 6 further comprising a nozzle flapper valve disposed within said movable element of said nozzle to allow liquid flow therethrough from said movable element toward said inlet and to block liquid flow therethrough from said inlet toward said movable element.

8. An improved device according to claim 6 wherein said pneumatic nozzle control means includes pneumatic nozzle control cylinder means and pneumatic nozzle control piston means longitudinally reciprocal within said nozzle control cylinder means, and one of said nozzle control piston and cylinder means is anchored relative to said suction tube and the other of said nozzle control piston and cylinder means is anchored to said movable element of said nozzle.

9. An improved device according to claim 6 further comprising a specimen collection receptacle disposed in communication with said specimen receiving chamber through a specimen collection port located proximate to said specimen inlet, an intake flapper valve located at said specimen inlet to permit liquid flow from said nozzle toward said specimen receiving chamber and to block liquid flow from said specimen receiving chamber toward said nozzle, and a collection port flapper valve located at said collection port to permit liquid flow from said specimen receiving chamber toward said specimen collection receptacle and to block liquid flow from said specimen collection receptacle toward said specimen receiving chamber.

10. An improved device according to claim 6 wherein said pneumatic plunger actuator means is comprised of a pneumatic pressure source, a plunger actuating piston to which said plunger is slaved, a plunger actuating cylinder secured relative to said suction tube and within which said plunger actuating piston is located wherein said plunger actuating piston divides said plunger actuating cylinder into first and second plunger control pneumatic chambers, pneumatic return control duct means connecting said pneumatic pressure source to said pneumatic nozzle control means and to said first pneumatic chamber of said plunger actuating cylinder, plunger pressure reduction means disposed in said pneumatic return control means to drop pressure from said pneumatic pressure source to an elevated plunger return pressure in said first pneumatic chamber of said plunger actuating cylinder, control valve means interposed between said pneumatic pressure source and said second pneumatic chamber of said plunger actuating cylinder and alternatively operable to a first position to isolate said pneumatic pressure source from said second plunger control pneumatic chamber of said plunger actuating cylinder, a second position conducting pneumatic pressure from said pneumatic pressure source to said second plunger control pneumatic chamber of said plunger actuating cylinder, and a third position in which pneumatic pressure is vented from said second pneumatic chamber of said plunger actuating cylinder.

11. An improved device according to claim 10 further comprising a pneumatic plunger return control reservoir in communication with said first plunger control pneumatic chamber of said plunger actuating cylinder.

12. An improved device according to claim 11 wherein said plunger return control reservoir is comprised of a length of tubing interposed between said plunger pressure reduction means and said first plunger control pneumatic chamber of said plunger actuating cylinder.

13. An improved device according to claim 11 further comprising a plunger return pressure bleed off valve coupled to said plunger return control reservoir for externally venting pneumatic pressure from said plunger return control reservoir.

14. An improved device according to claim 11 wherein said pneumatic nozzle control means includes pneumatic nozzle control cylinder means and pneumatic nozzle control piston means disposed for reciprocation within said nozzle control cylinder means and dividing said nozzle control cylinder means into first and second nozzle control pneumatic chamber means, nozzle actuating duct means coupled between said control valve means and said nozzle control cylinder means to conduct pneumatic pressure from said pressure source to said pneumatic chambers of said nozzle control cylinder means when said control valve means is operated to said second position, and nozzle pressure reduction means, and wherein said pneumatic return control duct means connects said pneumatic pressure source to said first nozzle control pneumatic chamber means of said nozzle control cylinder means, said nozzle pressure reduction means is interposed between said pneumatic pressure source and said first nozzle control pneumatic chamber of said nozzle control cylinder means, and wherein one of said pneumatic nozzle control cylinder means and piston means is secured relative to said suction tube and the other of said pneumatic nozzle control cylinder means and piston means is secured relative to said movable element of said nozzle.

15. An improved device according to claim 14 further comprising a pneumatic nozzle return control reservoir in communication with said first nozzle control pneumatic chamber means of said nozzle control cylinder means.

16. An improved device according to claim 15 wherein said nozzle return control reservoir is comprised of a length of tubing interposed between said nozzle pressure reduction means and said first nozzle control pneumatic chamber means of said nozzle actuating cylinder means.

17. An improved device according to claim 15 further comprising a nozzle return pressure bleed off valve in said pneumatic return control duct means for externally venting pneumatic pressure from said nozzle return control reservoir.

18. A device for collecting live biological specimens under water comprising:
- a cylindrical suction tube defining a receiving chamber therewithin and having an intake end with an intake port therein,
- a plunger disposed for longitudinal reciprocation within said suction tube,
- a pneumatic plunger actuator having a piston therewithin which divides said pneumatic plunger actuator into first and second pneumatic plunger chambers and wherein said piston is movable in longitudinal reciprocation within said pneumatic plunger actuator and is operatively connected to said plunger to reciprocate said plunger in tandem therewith,
- a pneumatic pressurizing means connected to said first chamber of said pneumatic actuator to bias said piston so as to urge said plunger toward said intake end of said suction tube,
- a pneumatic pressure source pressurized to a pressure greater than that of said pneumatic pressurizing means,
- a pneumatic control connecting line leading from said pneumatic pressure source to said second pneumatic chamber of said pneumatic actuator,
- control valve means connected in said pneumatic control connecting line and alternatively operable to a first position in which said pneumatic pressure source is isolated form said second pneumatic chamber, a second position in which said pneumatic pressure source is in communication with said second chamber whereby said plunger is forced away from said intake end of said section tube, and a third position in which said pneumatic pressurizing means is isolated from said second pneumatic chamber and said second pneumatic chamber is externally vented,
- a nozzle means having a fixed end coupled to said intake end of said suction tube and an opposite movable end, and
- pneumatic nozzle actuator means operatively connecting said movable end of said nozzle to said control valve means whereby said movable end of said nozzle means moves in tandem with said plunger and away from said inlet end of said suction tube when said control valve means is in said second position.

19. An improved device according to claim 18 further comprising a specimen collecting container disposed in communication with said receiving chamber by means of a collection port therebetween, a collection port flapper valve disposed in said collection port to permit liquid flow into said collecting container through said collection port and to block liquid flow into said receiving chamber through said collection port, an intake flapper valve located in said intake end of permit liquid flow into said receiving chamber through said intake port and to block liquid flow through said intake port toward said nozzle, and a nozzle flapper valve located in said movable end of said nozzle for permitting liquid flow therethrough toward said intake port and for blocking liquid flow therethrough away from said intake port.

20. A device according to claim 18 further comprising an exhaust line connected to said control valve means to form a venting outlet when said control valve means is in said third position, check valve means located in said exhaust line, and metering valve means located in said exhaust line.

* * * * *